United States Patent
Cardoso et al.

(10) Patent No.: US 11,307,947 B2
(45) Date of Patent: Apr. 19, 2022

(54) FAULT INJECTION SYSTEM AND METHOD OF FAULT INJECTION

(71) Applicant: HUAWEI TECHNOLOGIES CO., LTD., Shenzhen (CN)

(72) Inventors: Jorge Cardoso, Munich (DE); Goetz Brasche, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/894,760

(22) Filed: Jun. 6, 2020

(65) Prior Publication Data
US 2020/0301798 A1  Sep. 24, 2020

Related U.S. Application Data (63) Continuation of application No. PCT/EP2017/082049, filed on Dec. 8, 2017.

(51) Int. Cl.
*G06F 11/00*   (2006.01)
*G06F 11/26*   (2006.01)
(Continued)

(52) U.S. Cl.
CPC ........ *G06F 11/261* (2013.01); *G06F 11/3688* (2013.01); *G06F 21/556* (2013.01)

(58) Field of Classification Search
CPC .... G06F 11/261; G06F 11/3688; G06F 11/36; G06F 11/3636; G06F 11/3668; G06F 11/263; G06F 11/2215; G06F 21/556
See application file for complete search history.

(56) References Cited

U.S. PATENT DOCUMENTS

| | | |
|---|---|---|
| 6,477,666 B1 | 11/2002 | Sanchez et al. |
| 7,024,592 B1 | 4/2006 | Voas et al. |

(Continued)

FOREIGN PATENT DOCUMENTS

| | | |
|---|---|---|
| CN | 102760098 A | 10/2012 |
| CN | 102768642 A | 11/2012 |
| CN | 103678129 A | 3/2014 |

OTHER PUBLICATIONS

Peter Alvaro, Joshua Rosen, and Joseph M. Hellerstein. 2015. Lineage-driven Fault Injection. In Proceedings of the 2015 ACM SIGMOD International Conference on Management of Data (SIGMOD 15). ACM, New York, NY, USA, 331-346.

(Continued)

*Primary Examiner* — Joseph D Manoskey
(74) *Attorney, Agent, or Firm* — Rimon PC (57) ABSTRACT

A fault injection system for a software system, wherein the software system includes executable commands, events generated by commands and states representing a state of a state machine between two events, wherein a fault injection rule database is configured to provide a rule for injecting a selected fault, wherein the rule provides a fault injection decision in the occurrence of a selected command, a selected state during which fault injection is to occur and a condition under which fault injection is to occur; an estimator module is configured to determine when the selected state will occur related to the execution of the selected command and to provide a duration of a state as a time interval for fault injection, wherein the determination is based on a predictive time model; and an injector module is configured to execute the selected command and to inject the selected fault during the time interval.

14 Claims, 4 Drawing Sheets

(51) Int. Cl.
  *G06F 11/36*  (2006.01)
  *G06F 21/55*  (2013.01)

(56) References Cited

U.S. PATENT DOCUMENTS

| | | | |
|---|---|---|---|
| 9,628,339 B1 | 4/2017 | Thai et al. | |
| 2009/0158259 A1 | 6/2009 | Arcese | |
| 2010/0287535 A1* | 11/2010 | Kim | G06F 11/3688 717/127 |
| 2011/0289487 A1* | 11/2011 | Song | G06F 11/3664 717/130 |
| 2014/0258783 A1* | 9/2014 | Fenster | G06F 11/3688 714/38.1 |
| 2015/0193319 A1* | 7/2015 | Southern | G06F 11/263 714/41 |

OTHER PUBLICATIONS

Michael Alan Chang, Bredan Tschaen, Theophilus Benson, and Laurent Vanbever. 2015. Chaos Monkey: Increasing SDN Reliability through Systematic Network Destruction. SIGCOMM Comput. Commun. Rev. 45, 4 (Aug. 2015), 371-372.

Jia-Ju Bai, Yu-Ping Wang, Jie Yin, and Shi-Min Hu. 2016. Testing error handling code in device drivers using characteristic fault injection. In Proceedings of the 2016 USENIX Conference on Usenix Annual Technical Conference (USENIX ATC 16). USENIX Association, Berkeley, CA, USA, 635-647.

Guo Jiaojiao et al., "Reliability Calculation M ethod of Electromechanical System Based on Random Fault Injection Combined with Artificial Neural Network",Journal of Mechanical Engineering, vol. 53 No. 6,Mar. 2017,with an English abstract,total 9 pages.

* cited by examiner

FAULT INJECTION SYSTEM AND METHOD OF FAULT INJECTION

CROSS-REFERENCE TO RELATED APPLICATIONS

This application is a continuation of International Application No. PCT/EP2017/082049, filed on Dec. 8, 2017, the disclosure of which is hereby incorporated by reference in its entirety.

TECHNICAL FIELD

The present invention relates to a fault injection system, a method of fault injection and a computer program. In particular, the present invention relates a state-driven fault injection using time-based estimation.

BACKGROUND

The present invention relates to Software Implemented Fault Injection (SWIFI) systems and, in particular, to the injection of faults in large-scale distributed systems. Most existing SWIFI systems are unable to determine precisely at which state of a distributed system faults are injected. Even when SWIFI systems analyze events to precisely inject faults, such systems show a high latency between the state identification and the actual fault injection. Existing SWIFI systems suffer from one of the following limitations. Faults are randomly injected into a running distributed system. The latency between event identification, distributed system access, and fault injection creates a blind spot during which no faults can be injected into the distributed system.

The reliability and resilience of large-scale distributed systems such as cloud platforms is acquiring an increased relevance since society is relying more and more on complex software systems. Cloud computing is becoming as important as the other established utilities (e.g., water and electricity).

The new type of software systems supporting cloud platforms is extremely complex and new approaches for resilience and reliability engineering are needed. The complexity and dynamicity of large-scale cloud platforms require automated solutions to reduce the risks of eventual failures. Problems which need to be handled include the transient unavailability of services, scalability difficulties, demand spikes (i.e., the Slashdot Effect), correlated failures, hot upgrades, and interference between tenants.

To increase reliability and resilience, test coverage can be extended using Software Implemented Fault Injection. Fault injection has received much attention over the years. It has been recognized as a viable means for extending test coverage by analyzing the tolerance to faults that occur infrequently and which are not detected using normal testing techniques.

Software implemented fault injection has typically been used to inject faults into the code that has communicative or collaborative functions so that there is enough interaction to make the technique useful. Typical faults that may be injected include register and memory faults, dropped or replicated network packets, and erroneous error conditions and flags.

Compared to previous systems under test, cloud platforms are large-scale complex distributed systems which require new approaches to extend test coverage using fault injection.

Traditional event-based SWIFI systems typically rely on ECA-like rules (Event-Condition-Action) which are continuously evaluated to decide when to inject faults. While event-based approaches to inject faults work well with centralized systems, they have serious limitations when applied to test large-scale distributed systems since they suffer from an injection delay, i.e. a blind spot during which it is not possible to inject a fault.

Software Implemented Fault Injection systems which use event-based approaches to inject faults in a distributed system under test have an inherent problem: the inability of injecting faults in the period from the instant of time (t1) when a command is executed (and events start to be generated by the target system) and the instant of time when the injection system is able to inject a fault (t2). In other words, it is not possible to inject a fault in the period [t1, t2].

Current SWIFI systems often use an approach which rely on some type of ECA (Event-Condition-Action) model which is triggered when a command CMD is executed:
ON EVENT Ei CONDITION Cj ACTION Ak In response to command CMD, events $E_i, E_j, \ldots, E_k$ are generated by the target software system under test. The events are recognized using a data collection module. The events are transported using a messaging system. The events are processed using a real-time processing module to detect events of interest. When events of interests $E_i, E_j, \ldots, E_k$ are identified, when condition $C_j$ is satisfied, the fault injection manager will take an action $A_k$ and inject a fault into the target software system.

The problem of such approaches is that since several systems are involved to generate, recognize, transport, process, and identify events, and inject faults, there is an injection latency between the execution of a command CMD, the generation of events $E_i, E_j, \ldots, E_k$, and the injection of a fault into the target system under test. This injection latency is a blind spot during which no fault can be injected.

With traditional event-based SWIFI systems, testers typically write a set of ECA-like rules which are continuously evaluated by the SWIFI system to decide when to inject faults. Let us consider that the following reactive ECA rule has been specified:
ON EVENT Ek CONDITION SEQ(Ei, Ej, . . . , Ek−1) ACTION INJECT Ft SEQ is a condition which determines whether the ECA rule is to be executed.

If it is evaluated to True, the following ACTION executes, otherwise it is skipped. It is reevaluated when a new event is generated. It is handled by a function which returns True only when the event sequence ES=(Ei, . . . , Ek−1) was generated by the target system under test. Other types of functions can be specified besides SEQ which evaluates sequences of events. INJECT Ft, F={F1, . . . , Fm} is a set of actions which can be executed. In SWIFI systems, the actions are faults which are injected into the target system.

While an event-based approach to inject faults works well for centralized systems, it has serious limitations when applied to test large-scale distributed systems.

The event-based approach will be used to illustrate how blind spots emerge in this type of fault injection systems.

The event-based approach includes the following steps of data collection, messaging, real time processing and fault injection.

During data collection the events are recognized using for example a data collection module in interval (t1-t2). This subsystem is often part of the target system under test. Often this subsystem also structures events into higher structures such as traces.

During messaging the events are transported using for example a messaging system. The data collection sends the events to the messaging systems during interval (t2-t3). This entails moving large amounts of log or trace data from many different sources to a centralized data store. Several transport mechanisms based on message queues can be used.

During real time processing the events are processed using for example a real-time processing engine to detect events and patterns of interest. Pattern matching techniques are used to process events and detect the presence of certain event sequences or patterns in interval (t3-t4).

During fault injection events of interests (Ei, Ej, . . . , Ek) are identified, for example a fault injection manager makes an action and injects a fault into the target system under test. The action is taken in interval (t4-t5). The manager carries out two main activities. Searching for the fault to inject and injecting the fault Ft in the target system. The fault is considered to be injected at t5.

Thus, the injection delay of the ECA rule ON EVENT Ek CONDITION SEQ(Ei, Ej, . . . , Ek−1) ACTION INJECT Ft is interval t5-t1. This injection delay is a blind spot of event-based approaches to build SWIFI systems to test distributed systems.

SUMMARY

In view of the above-mentioned problems and disadvantages, the present invention aims to improve software implemented fault injection. The present invention has thereby the object to provide a fault injection system and a method of fault injection, which operate with better performance compared to the corresponding solutions known in the art.

The object of the present invention is achieved by the solution provided in the enclosed independent claims. Advantageous implementations of the present invention are further defined in the dependent claims.

In particular the present invention proposes a solution to eliminate the duration of blind spots. It builds a predictive time model indirectly from the analysis of the instants in time when past events were generated. The predictive model is a proxy, which predicts the instants of time when states and transitions of the distributed system occur.

A first aspect of the present invention provides a fault injection system for a software system, wherein the software system includes executable commands, events generated by commands and states representing a state of a state machine between two events, wherein a fault injection rule database is configured to provide a rule for injecting a selected fault, wherein the rule provides a fault injection decision in the occurrence of a selected command, a selected state during which fault injection is to occur and a condition under which fault injection is to occur;

an estimator module is configured to determine when the selected state will occur related to the execution of the selected command and to provide a duration of a state as a time interval for fault injection, wherein the determination is based on a predictive time model; and an injector module is configured to execute the selected command and to inject the selected fault during the time interval.

The present invention provides a solution to identify precisely at which state of a software system faults are to be injected and eliminates the latency problem between state identification and fault injection. The invention is especially beneficial for distributed software systems. The present invention may use distributed tracing technology and temporal estimation to inject faults when a distributed system is estimated to be in a particular state. The use of distributed tracing technology supports the construction of a state diagram of a distributed systems operation and precisely identifies at which states faults should be injected. The use of temporal estimation may enable to model the start and end instant of time of each state.

This present invention provides a solution to circumvent injection latency and enable to inject faults in blind spots. It may provide two techniques called event slicing and dynamic event slicing which use point estimates, confidence intervals, event correlation, and distributed tracing to estimate the interval of time when a system or distributed system is in a particular state and a fault should be injected.

The present invention provides a solution to reduce the duration of blind spots when injecting faults. It builds a predictive time model indirectly from the analysis of the instants in time when past events were generated. The predictive model is a proxy which predicts the instants of time when states and transitions of the distributed system occur. Instead of generating, recognizing, transporting, processing, and identifying events in real-time to determine when to inject faults, this invention uses a large quantity of past events and time information to build a predictive time model which is used to estimate when faults should be injected in the target system. The time model gives statistical insights about when states of the distributed system occur, the duration of states, and when transitions are enabled. The predictive time model and certain times, timings or time intervals are seen in the context of this description as relative to the execution of one or more commands.

The present invention has the advantage of marginal injection latency. The proposed time-driven fault injection is a better solution than purely event-based fault injection since it does not suffer from the so-called injection latency. A further advantage is the precise fault injection. Identifying states, optionally using distributed traces to capture the behavior of distributed systems enables to use state machines to achieve a precise injection of faults. A further advantage is the uniform variability of injection. The optional use of estimation points and confidence intervals enables to inject faults within selected states using a discrete random variable. A further advantage is the observer effect. Several event-based approaches slow down or even pause the distributed system under test to enable the fault injection module to inject a fault in a particular state. These strategies address the problem of injection latency. The proposed time-driven fault injection does not require to artificially alter the temporal behavior of the system under test.

When compared to a pure event-based approach, this invention enables to dramatically reduce the injection latency since events do not need to be generated, recognized, transported, processed, and identified.

In an implementation form of the first aspect, the rule comprises the following formula, FOR COMMANDc ON STATE S(EVENTm, EVENTn) CONDITION SEQ (EVENTi, EVENTj, . . . , EVENTk) ACTION INJECT FAULTt. This formula allows an easy implementation of a state based injection rule. Instead of a condition sequence (CONDITION SEQ) a single condition may be used. A single fault or various types of faults can be injected.

In a further implementation form of the first aspect, a bootstrap module is configured to execute a command, to determine events generated by the executed command and to store relationships between commands and events. These relationships can be used as a base for the time-based estimation. For generating the relationships the bootstrap module can operate in a training mode or it can determine and store such relationships during normal operation of the software system.

In an implementation form of the first aspect, the bootstrap module is configured to execute the command several times. Then, statistical methods may be employed to average the occurrence of events or relationships. For example, the time from the start of the command to the termination of an event may be averaged.

In a further implementation form of the first aspect, the bootstrap module is configured to generate a tracing ID at the execution of a command and to determine events generated by the executed command based on a matching tracing ID of an event. Such tracing ID or tracing mechanism allows, especially for distributed systems, an exact mapping of processes and events generated by one or more certain commands.

In an implementation form of the first aspect, the estimator module is configured to provide the predictive time model according to which the occurrence and the duration of a state is predicted, wherein the state occurs after an elapsed time of a first event and wherein the duration of a state starts after the first event and ends before a second event, wherein both events originate from the same command and wherein the elapsed time is defined by a time interval starting with the execution of the command and ending with the termination of the event. Such provision of the predictive time model allows for a simple and reliable state based model.

In a further implementation form of the first aspect, the estimator module is configured to provide the elapsed time of an event by slicing events to determine events of the same type. By slicing events, events of the same type can be identified and statistically analyzed.

In an implementation form of the first aspect, the estimator module is configured to provide a point time estimation for the elapsed time of an event by averaging elapsed times of the event. By averaging elapsed times of the same events the accuracy of the prediction is improved.

In a further implementation form of the first aspect, the estimator module is configured to provide a confidence interval for the point time estimation for the elapsed time of an event. By provide a confidence interval errors of the prediction may be reduced.

In an implementation form of the first aspect, the injector module is configured to inject the selected fault at a random point of time in the time interval. By randomizing the fault injection, within the time interval, more possible states of the system can be tested. Alternatively, defined patterns or distributions may be used for injecting the selected fault in the time interval. This may allow intensified testing of otherwise rarer cases or states.

In a further implementation form of the first aspect, the fault injection system is configured to inject faults into a distributed software system. As the problem of the blind spot is more severe for distributed software systems, the present invention is adapted especially to such systems.

In an implementation form of the first aspect, the injector module is configured to check whether the selected fault was injected during the selected state and if the selected fault was not injected during the selected state, is further configured to receive a further time interval from the estimator module and to again execute the selected command and to inject the selected fault during the further time interval. Just for cases in which the prediction was not valid, it is checked whether the selected fault was injected during the selected state so that the injection can be repeated in case of an error. When time estimates reveal to be incorrect, the associated fault injection test may be aborted and a new test may be conducted. This may be repeated until an estimate is classified as valid.

A second aspect of the present invention provides a method of fault injection into a software system, wherein the software system includes executable commands, events generated by commands and states representing a state of a state machine between two events, comprising, providing a rule for injecting a selected fault, wherein the rule provides a fault injection decision in the occurrence of a selected command, a selected state during which fault injection is to occur and a condition under which fault injection is to occur; determining when the selected state will occur and to provide a duration of a state as a time interval for fault injection, wherein the determination is based on a predictive time model; and executing the selected command and injecting the selected fault during the time interval. The same advantages and modifications as described above apply.

In an implementation form of the second aspect, the method comprising providing the predictive time model by providing the occurrence and the duration of a state, wherein the state occurs after an elapsed time of a first event and wherein the duration of a state starts after the first event and ends before a second event, wherein both events originate from the same command and wherein the elapsed time is defined by a time interval starting with the execution of the command and ending with the termination of the event. Such provision of the predictive time model allows for a simple and reliable state based model.

A third aspect of the present invention provides a computer program with a program code for performing the method as described above when the computer program runs on a computer or the fault injection system as described above. The same advantages and modifications as described above apply.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of embodiments, a functionality or step to be performed by external entities is not reflected in the description of a detailed element of that entity which performs that step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of embodiments in relation to the enclosed drawings, in which.

DESCRIPTION OF EMBODIMENTS

Figure 1:
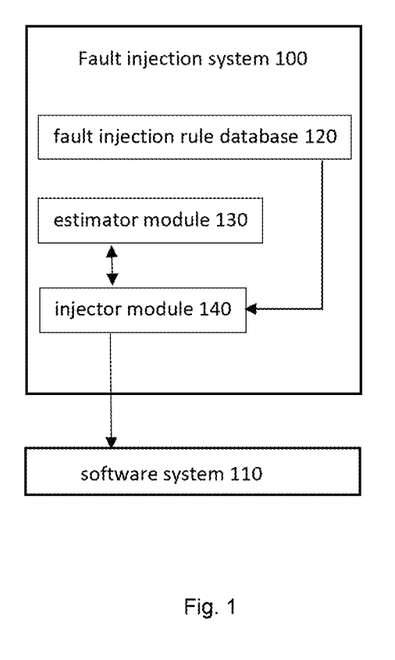
FIG. 1 shows an example of the architecture of the fault injection system.

FIG. 1 shows a fault injection system 100 for a software system 110. The software system 100 includes executable commands CMD, events E generated by commands CMD and states S) representing a state of a state machine between two events E.

The fault injection system 100 includes a fault injection rule database 120, which is configured to provide a rule for injecting a selected fault, wherein the rule provides a fault injection decision in the occurrence of a selected command, a selected state during which fault injection is to occur and a condition under which fault injection is to occur.

The fault injection system 100 further includes an estimator module 130, which is configured to determine when the selected state will occur related to the execution of the selected command and to provide a duration of a state as a time interval for fault injection, wherein the determination is based on a predictive time model.

The fault injection system 100 further includes an injector module 140, which is configured to execute the selected command and to inject the selected fault into the software system 100 during the time interval.

In FIG. 1a first embodiment of the fault injection system 100 is shown. Further embodiments reflecting more detailed and optional implementations of the first embodiment as depicted in FIG. 1 are shown in the following Figures.

Figure 2:
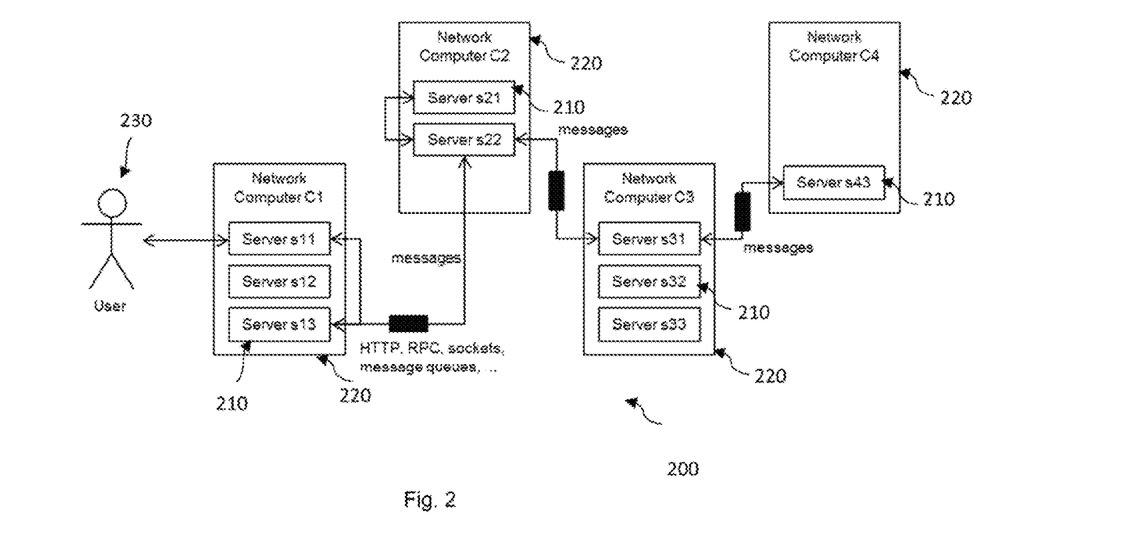
FIG. 2 shows an example of a distributed software system.

FIG. 2 shows the typical architecture of a distributed system (DS) 200. A distributed system 200 is a software system in which servers 210 are located on networked computers 220. Servers 210 are for example computer programs that provide functionality for other programs. Servers 210 communicate by passing messages, thereby using for example HTTP, RPC-like connectors, sockets, and message queues.

The present invention is particularly suitable for large-scale, complex distributed systems 200 implemented using a service-oriented architecture (SOA) or following a micro-service paradigm, which are approaches for connecting systems exposed as services. These systems are complex distributed systems in which the provision of a service to the end user requires communicating and interacting between multiple services. Each service provides a valuable software function. End-users services can be invoked directly by end users 230. Service provisioning is the fulfillment of a service requested by an end user. It can be represented as a finite state machine which identifies all the services involved and their logical/temporal dependencies during provisioning.

In the following, some expressions as used throughout this description are explained.

Software Implemented Fault Injection (SWIFI). SWIFI systems enable the injection of faults to be performed by software and injects faults into a running software system. This approach is called runtime injection. Faults can be injected via a number of methods and triggers for faults can be implemented in a number of ways such as time-based, event-based, and interrupt-based triggers.

Injection Latency. Injection Latency is the elapsed time between the generation of the events which lead to the identification of a distributed system state and the actual instant of time when a fault is (can be) injected. Injection latency is a blind spot during which it is not possible to inject a fault into the system under test.

Event. Modern software systems generate events to externalize their internal state when processing user requests. For example, a distributed software system under observation can generate one or more events each time a user executes a command to request a record to be inserted, updated, or deleted from a database or when it calls an external server using RPC (Remote Procedure Call) technology.

$E=\{E1, \ldots, En\}$ is a set of events which identifies important milestones reached by a distributed system during its operation. An event Ei captures two important dimensions: temporal and spatial.

On the one hand, it captures the instant in time that marks an important behavior or change of behavior of a distributed system. On the other hand, an event Ei also captures the code in execution, which marks a milestone. An event is implicitly related to three important concepts. It marks the start of a state, the end of a state, and it is associated with a transition, which indicates a change from one state to another state. Between consecutive events, no change in the system is assumed to occur. For simplicity reasons, the instant in time of the initial state is often set to 0 and marks the start of the first state of the distributed system.

State. A state S(CMDc, Ei, Ej) represents a continuous segment of instructions executed as a response to the execution of command CMDc and delimited by events Ei and Ej. The state starts once Ei is generated and ends before event Ej is generated. A distributed system will stay in a state S(CMDc, Ei, Ej) until an event Ej is generated which indicates that the state has changed. The events are not part of the state and represent transitions of a state machine.

Event Sequence. An event sequence $ES=(E0, E1, \ldots, Ei)$ is an enumerated collection of events in which repetitions are allowed. The order matters and the same event can appear multiple times at different positions in the sequence. Sequence (E0, E1, . . . Ei−1, Ei) indicates that event Ei−1 was generated before event Ei, and event E1 was generated after event E0. Event sequences are generated when users execute commands.

Command. A command CMDc is an instruction given by a user requesting a distributed system to execute a function or service. For example, the command line interface can be used to create a virtual machine VM1 using the command CMDc='cloud_client server create VM1'. The execution of a command triggers a sequence of events to be generated. The relation between events, states, event sequences, and commands can be represented by (the arrow '->' means generates):
CMDc->S1(CMDc,E0,E1),S2(CMDc,E1,E2),S3(CMDc, E2,E3),S4(CMDc,E3,E4)

Figure 3:
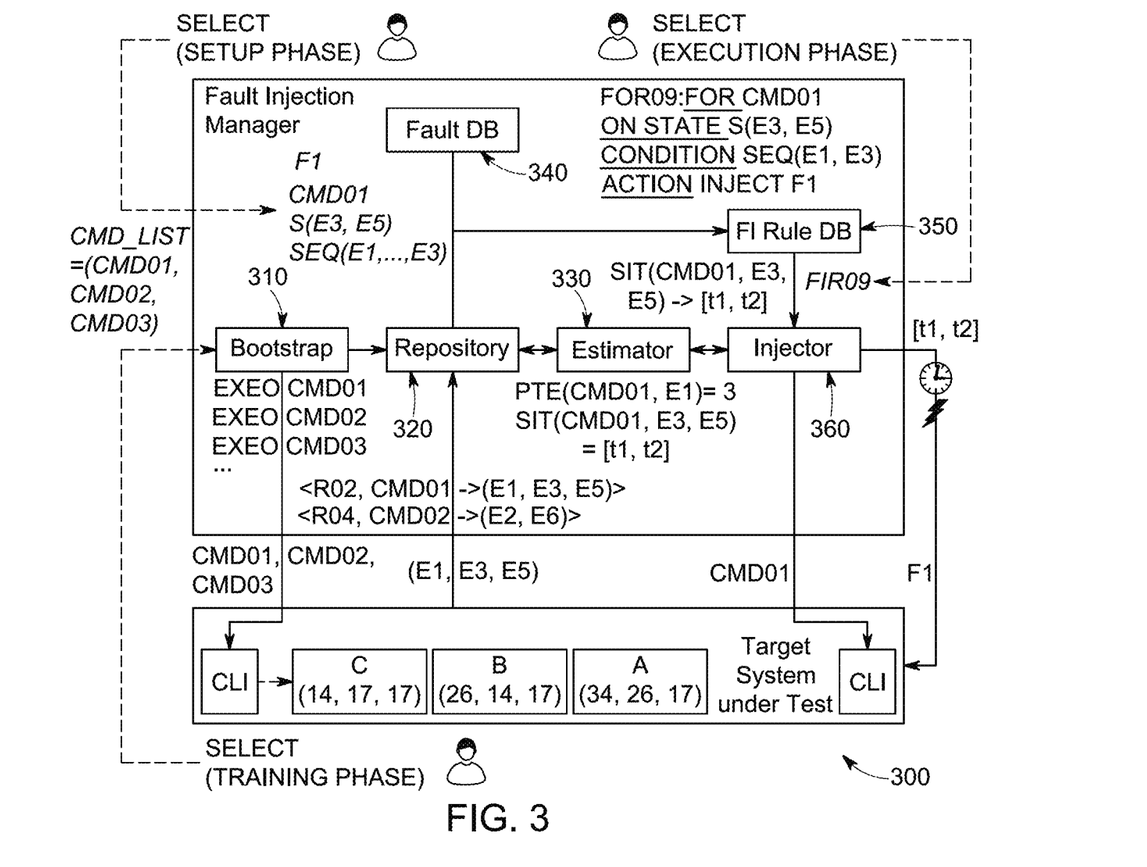
FIG. 3 shows an example of the architecture of the fault injection system.

FIG. 3 shows an example of the architecture of the fault injection system 300. The fault injection system 300 includes the following modules. First, the structure of the fault injection system 300 is explained in view of FIG. 2. The operation of the fault injection system 300 is explained later in view of FIGS. 3 and 4 in conjunction with FIG. 2.

A bootstrap module 310 is responsible for the bootstrapping, which refers to a self-starting process that fills a repository module 320 with relationships between commands CMDc and events. Such relationships have for example the following format:
<R02,CMD01->(E1,E3,E5)>

The repository module 320 is a database, which stores the relationships generated by the bootstrapping process. The repository module 320 provides an interface which enables to query and retrieve which events Ei are generated from the execution of a command CMD. The repository module 320 receives from the bootstrap module 310 the executed commands so that it can relate events to commands.

An estimator module 330 retrieves information on events from the repository module 320 to generate estimates for when states and transitions occur.

A fault database 340 is a database, which includes a specification of the faults available for injection.

A fault injection (FI) rule database 350 stores rules of the form FOR CMDc ON STATE S(Ek, Ek+1) CONDITION SEQ(Ei, Ej, . . . , Ek−1) ACTION INJECT Ft. When a command is executed, this module 350 will identify which rule(s) specify a sequence of events, which is a subsequence of the events generated by the command.

An injector module 360 is responsible for executing a command CMDc and injecting a fault Ft at a predefined time t.

Figure 4:
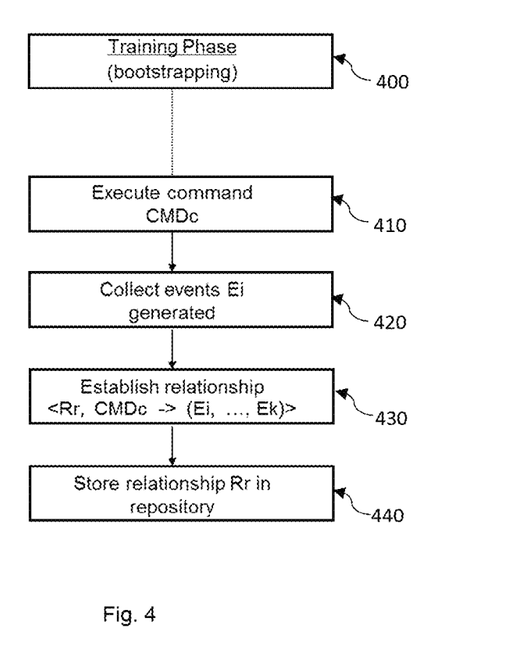
FIG. 4 shows a flowchart of a training phase of a fault injection.

FIG. 4 shows a flowchart of a training phase 400 of a fault injection. The system is bootstrapped by the bootstrap module 310. The bootstrapping fills the repository module 320 with relationships between commands CMD and events (Ei, Ej, . . . , Ek). For example, the relationship CMD01->(E1, E3, E5). The bootstrap module 310 receives a list of commands CMD_LIST. Each command CMD of CMD_LIST is executed to determine which events Ej are generated by the target system under test. Each command will be later tested using fault injection.

The relationships are constructed using the following procedure. In a first step 410 command CMD01 from the list of commands CMD_LIST is executed. In a second step 420 the events (E1, E3, E5) generated from the execution of command CMD01 are collected. In a third step 430 a relationship like for example CMD01->(E1, E3, E5) between a command and the events generated from the execution of this command is established. In a fourth step 440 the relationship is stored in the repository module 320 as <R02, CMD01->(E1, E3, E5)>. Such procedure is repeated for each command of the list of commands.

The repository module 320 typically stores thousands relationships Rr. Establishing a relationship between a command CMDc and the events (Ei, Ej, . . . , Ek) generated from the execution of CMDc is important to the present invention and may adopt a special technique from the field of distributed tracing. In complex systems, the same type of event Ei can be generated at very different instants in time since events depend on the context of execution. For example, two commands CMD1 and CMD2 can generate the same event Ei at times t1 and t2, with t1 and t2 being very different.

Furthermore, in multi-tenant systems hundreds of events are constantly generated as part of the background operations such as cache synchronization and storage replication. It is often not possible to know if event Ei belongs to a command CMDc, to a command CMDc+1 or if it belongs to a background process. Additionally, when commands are executed in parallel, it is necessary to determine to which context events belong to.

The present invention may handle these problems by using a trace ID (TID) as the context for the events that will be generated from the execution of a command. To use TIDs as a context there is the need to establish a correlation between events, commands, and trace IDs. This correlation may be established using distributed tracing.

The TID procedure can be described in general terms as follows. A TID is generated when a command CMDc is executed. The TID is propagated to all the processes/services handling the provisioning of the command. The events generated by processes/services are provides with an included respective TID. Relationships are stored in the repository with the TID as <Rr, TID, CMDc->(Ei, Ej, . . . , Ek)>. For simplicity reasons, in this description relationships are represented omitting the TID as <Rr, CMDc->(Ei, Ej, . . . , Ek)>. Using the TID procedure, the repository module 320 may receive from the bootstrap module 310 the executed commands and/or the TID so that it can relate events to commands. Alternatively, the repository module 320 may extract the corresponding command from an event using the TID.

To correctly bootstrap the SWIFI, each command may be executed several times. A large quantify of samples for the same command will guarantee the construction of good estimators for events.

After such training phase 300 the repository module 320 stores relationships Rr. The bootstrap module 310 is further configured to execute commands during normal operation. As during the training phase 300, the target system under test will also react to commands and will provide the repository module 320 with events related to the commands to build relationships.

Figure 5:
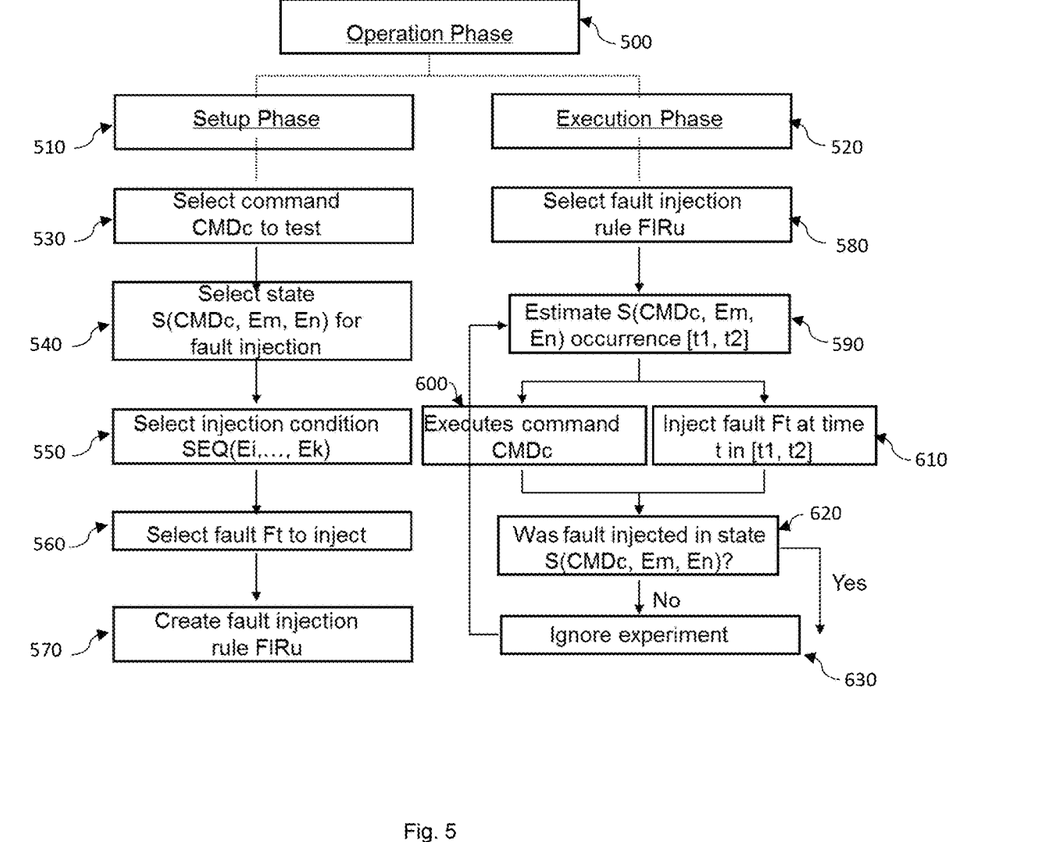
FIG. 5 shows a flowchart of an operation phase of a fault injection.

FIG. 5 shows a flowchart of an operation phase 500 of a fault injection. The operation phase 500 comprises a setup phase 510 and an execution phase 520.

During the setup phase 510 of the operation phase 500, a user for example a Quality Assurance (QA) engineer constructs fault injection rules according to the following steps.

In a first step 530 a command CMDc to be tested is selected from the repository module 320. In a second step 540 a state S(CMDc, Em, En) during which a fault will be injected is selected. In a third step 550 a condition SEQ(Ei, Ej, Ek) under which injection will occur is selected. In a fourth step 560 a fault Ft to inject during the test of the command CMDc is selected.

The information is used to construct a fault injection rule managed by the FI Rule database module 350 in step 570. This module 350 stores rules of the form:
FIRu: FOR CMDc ON STATE S(Em, En) CONDITION SEQ(Ei, Ej, . . . , Ek) ACTION INJECT Ft During the execution phase 520, the QA engineer selects in a first step 480 a fault injection rule FIRu from the FI Rule database module 350 to be applied to a command CMDc. The injector module 360 parses the FIRu rules and contacts the estimator module 330 to determine in a second step 590 when a state S(CMDc, Em, En) will occur to determine when should fault Ft be injected once the execution of command CMDc starts. The estimator module 330 uses the repository module 320 to retrieve information on events, such as timing, to generate estimates for when states and transitions occur.

The estimator module 320, based on all available relationships Rr in the repository module 320, estimates that the interval of time when the target system under test will be in state S(CMDc, Em, En) is [t1, t2]. The injector module 360 executes in step 600 command CMDc and injects fault Ft at time tin [t1, t2] in step 610. Once the command completes its execution, the injector module 360 checks in step 620 if the fault was indeed injected in state S(CMDc, Em, En) by identifying its start and end time. If the fault was not injected in state S(CMDc, Em, En), the time-driven SWIFI system ignores the test in step 630 since the estimate was inaccurate and re-executes the execution phase until a valid estimation is given.

One of the important components of the proposed time-driven SWIFI system 300 is the estimator module 630 since it is responsible for predicting at which time the distributed system will reach a particular state and the duration of the state. This temporal information is used to inject faults. The interval of time associated with a state S(Em, En) is estimated using a representative point for the distribution (e.g., mean value) for events Em and En. In practice, most acceleration or delays of events occur in the proximity of the average duration while only few outliers can be found at some distance to the expected instant in time. Thus, in systems operating under normal conditions, Gaussian distributed noise is a reasonable distribution for estimation.

Point estimates and confidence intervals may be used to provide estimates for when events and states occur. To estimate when a state S(Em, En) will occur and its duration [tm, tn], the technique termed event slicing analyses all the events generated and stored in the repository module 320 by the bootstrap module 310. The technique is called event slicing since it will slice all the events stored using their type as the slicer. The objective of the analysis is to build a statistical model to estimate the time of occurrence of events for the same type of events.

The prerequisits and definitions are the following:

Each event Ei has a type returned by Function TY(Ei). Events of the same type indicate that they are comparable and can be used to define a state. For example, two events generated by the same module, method, and code instructions but by a server with a different IP can be considered to be of the same type and contribute in the same way to define the start or the end of a state. To simplify the notation, events with the same index are of the same type, i.e., if TY(Ei)=TY(Ej), then i=j.

Each event has an elapsed time ET(CMDc, Ei) measured from the instant in time when command CMDc that generated it was executed.

A state S(Ei, Ej) has a state interval of time SIT(CMDc, Ei, Ej) with SIT(CMDc, Ei, Ej)=[ET(CMDc, Ei), ET(CMDc, Ej)].

To estimate the time occurrence of state S(Em, En), point estimates for events Em and En may be calculated. The function PTE(CMDc, Ei) provides a point time estimation (PTE) for the elapsed time of event of type Ei for command CMDc. PTE calculates the average (arithmetic mean) of all the events of type Ei stored in the repository module 320 and generated by CMDc. For example, PTE(CMD01, E2) provides a time estimation for the elapsed time of events of type E2 for command CMD01 which is calculated as, e.g., (ET(CMD01_1, E2)+ET(CMD01_2, E2)+ET(CMD01_3, E2))/3, wherein the commands CMD01_1, CMD01_2 and CMD01_3 are the same command CMD01 bute executed at different points of time.

A point estimate gives an approximation for timing information about states, but estimates are prone to errors. A confidence interval for events is a range of values above and below a point estimate that captures the true estimate at some predetermined confidence level. For example, to have a 95% probability of capturing the true occurrence and duration of a point estimate and a corresponding confidence interval. Higher confidence levels result in narrower confidence intervals. The confidence interval is calculated by taking a point estimate and then adding and subtracting a margin of error to create a range. The margin of error is based on the confidence level, the spread of the data and the size of the sample of events.

For a set of n events Ei with a standard deviation for their instant in time of $\delta$, and z the z-critical value, the confidence interval for estimated SIT(CMDc, Ei, Ej), for command CMDc and for state S(CMDc, Ei, Ej) is calculated as:

$$[ts,te]=[ET(CMDc,Ei)-z*(\sigma/\sqrt{n}),ET(CMDc,Ej)+z*(\sigma/\sqrt{n})], \text{ where}$$

ts is the start time of the state
te is the end time of the state

The z-critical value (z) is the number of standard deviations to go from the mean of the normal distribution to capture the proportion of the data associated with the desired confidence level. For a 95% confidence interval, a z-value is 1.96.

For a command CMDc under test and for a state S(CMDc, Ei, Ej) selected by the QA engineer, the estimator module 330 will provide the confidence interval [ts, te] for the estimated SIT(CMDc, Ei, Ej) to the injector module 360. The injector module 360 executes command CMDc and injects fault Ff at time t, where t is a point drawn randomly from interval [ts, te].

The technique event slicing estimation works well with stable systems since they generate events at instants which are statistically bounded by known confidence intervals.

Distributed systems which exhibit progressive performance degradation due to the exhaustion of resources, fragmentation and accumulation of errors require estimation methods which accounts for irregularities in event occurrence to handle software aging. For example, when the utilization of the CPU of a physical node of a distributed system increases, the events of the traces generated from the execution of a command CMD will be generated at later instants of time and will have an increased elapsed time.

Continuously recomputing time estimates for events to reflect recent behavioral changes in distributed systems under experimentation improves the accuracy of estimation, and, thus, the probability associated with the injection of faults in predefined states.

Adaptive event slicing estimation uses time-series smoothing to provide a more accurate estimation for events since it can reduce the variation of the instant in time when events happen. By analyzing historical events over time, it is possible to better understand the pattern of past behavior and better predict when future events will occur. When test experiments are executed, the events generated are also stored in the repository. These new events are used to update current time estimates for events.

The estimator module 330 may use several exponential smoothing techniques depending on the time series associated with events.

Single exponential smoothing is used when the past events do not show trends or seasonal changes.

Double exponential smoothing is used when events show a trend.

Triple exponential smoothing (also called Holt-Winters forecasting model) is used when trend and seasonal effects are present.

For single exponential smoothing the following procedure is proposed. To forecast the interval of time to inject fault Ft for command CMDc at state S(CMDc, Ei, Ej), the estimator module 330 selects from the repository module 320 all the past events Eik and Ejl of type Ei and Ej which are part of traces created from executing command CMDc. The indexes k and 1 represent the logical order of the events. When using single exponential smoothing, the following formula is applied to forecast the interval of time when the fault can be injected:

$$PTE(CMDc,Eik)=\alpha*ET(CMDc,Eik-1)+(1-\alpha)*ET(CMDc,Eik)$$

The parameter $\alpha$ is the smoothing constant (a value from 0 to 1) and can be selected for example using the Levenberg-Marquardt algorithm. It enables to use decreasing weights some distance back in time.

The moving average requires a window size N called the window width. This defines the number of raw observations used to calculate the moving average value. For instance, at time t, a "centered/left moving average of length 3" with equal weights would be the average of a windows N with N values at times t3, t2, and t1. The "moving" part in the moving average refers to the fact that the window defined by the window width is slided along the time series to calculate the average values in the new series. This average is used for forecasting the value of the time series for the next period fault injection experiment. Moving average is useful for distributed systems that stay fairly steady over time between N executions.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A fault injection system for a software system, wherein the software system comprises executable commands, events generated by commands and states representing a state of a state machine between two events,
wherein the fault injection system comprises:
   a fault injection rule database configured to provide a rule for injecting a selected fault, wherein the rule provides a fault injection decision in the occurrence of a selected command, a selected state during which fault injection is to occur and a condition under which fault injection is to occur;
   an estimator module configured to determine when the selected state will occur related to the execution of the selected command and to provide a duration of a state as a time interval for fault injection, wherein the determination is based on a predictive time model; and
   an injector module configured to execute the selected command and to inject the selected fault during the time interval, wherein the injector module is configured to check whether the selected fault was injected during the selected state and if the selected fault was not injected during the selected state, the injector module is further configured to receive a further time interval from the estimator module and to again execute the selected command and to inject the selected fault during the further time interval.

2. The fault injection system according to claim 1, wherein the rule comprises the following formula, FOR COMMANDc ON STATE S(EVENTm, EVENTn) CONDITION SEQ(EVENTi, EVENTj, . . . , EVENTk) ACTION INJECT FAULTt.

3. The fault injection system according to claim 1, further comprising:
   a bootstrap module configured to execute a command, to determine events generated by the executed command, and to store relationships between commands and events.

4. The fault injection system according to claim 3, wherein the bootstrap module is configured to execute the command multiple times.

5. The fault injection system according to claim 3, wherein the bootstrap module is configured to generate a tracing ID at the execution of a command and to determine events generated by the executed command based on a matching tracing ID of an event.

6. The fault injection system according to claim 1, wherein
   the estimator module is configured to provide the predictive time model according to which the occurrence and the duration of a state is predicted, wherein the state occurs after an elapsed time of a first event and wherein the duration of a state starts after the first event and ends before a second event, wherein both events originate from the same command and wherein the elapsed time is defined by a time interval starting with the execution of the command and ending with the termination of the event.

7. The fault injection system according to claim 6, wherein
   the estimator module is configured to provide the elapsed time of an event by slicing events to determine events of the same type.

8. The fault injection system according to claim 6, wherein
   the estimator module is configured to provide a point time estimation for the elapsed time of an event by averaging elapsed times of the event.

9. The fault injection system according to claim 8, wherein
   the estimator module is configured to provide a confidence interval for the point time estimation for the elapsed time of an event.

10. The fault injection system according to claim 6, wherein
   the estimator module is configured to provide the elapsed time of an event by employing exponential time smoothing on the elapsed times of past events of the event type.

11. The fault injection system according to claim 1, wherein
   the injector module is configured to inject the selected fault at a random point of time in the time interval.

12. The fault injection system according to claim 1, wherein the fault injection system is configured to inject faults into a distributed software system.

13. A method of fault injection into a software system, wherein the software system includes executable commands, events generated by commands and states representing a state of a state machine between two events, comprising
   providing a rule for injecting a selected fault, wherein the rule provides a fault injection decision in the occurrence of a selected command, a selected state during which fault injection is to occur and a condition under which fault injection is to occur;
   determining when the selected state will occur to provide a duration of a state as a time interval for fault injection, wherein the determination is based on a predictive time model, wherein the predictive time model comprises an occurrence and a duration of the state and wherein the state occurs after an elapsed time of a first event and the duration of a state starts after the first event and ends before a second event, wherein both events originate from the same command and wherein the elapsed time is defined by a time interval starting with the execution of the command and ending with the termination of the event; and executing the selected command and injecting the selected fault during the time interval.

14. A computer system, comprising a processor, and a memory, the memory stores executable commands, that when processed by the processor, cause the processor to:

provide a rule for injecting a selected fault, wherein the rule provides a fault injection decision in the occurrence of a selected command, a selected state during which fault injection is to occur and a condition under which fault injection is to occur;

determine when the selected state will occur to provide a duration of a state as a time interval for fault injection, wherein the determination is based on a predictive time model, wherein the predictive time model comprises an occurrence and a duration of the state and wherein the state occurs after an elapsed time of a first event and the duration of a state starts after the first event and ends before a second event, wherein both events originate from the same command and wherein the elapsed time is defined by a time interval starting with the execution of the command and ending with the termination of the event; and execute the selected command and inject the selected fault during the time interval.

* * * * *